United States Patent

Papworth et al.

[11] Patent Number: 5,987,600
[45] Date of Patent: *Nov. 16, 1999

[54] EXCEPTION HANDLING IN A PROCESSOR THAT PERFORMS SPECULATIVE OUT-OF-ORDER INSTRUCTION EXECUTION

[75] Inventors: David B. Papworth, Beaverton; Glenn J. Hinton, Portland; Michael A. Fetterman, Hillsboro; Robert P. Colwell, Portland; Andrew F. Glew, Hillsboro, all of Oreg.

[73] Assignee: INTEL Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/851,140

[22] Filed: May 5, 1997

Related U.S. Application Data

[63] Continuation of application No. 08/417,463, Apr. 5, 1995, abandoned, which is a continuation of application No. 08/160,495, Dec. 1, 1993, abandoned.

[51] Int. Cl.⁶ .................................................... G06F 9/00
[52] U.S. Cl. ........................................... 712/244; 712/239
[58] Field of Search ..................................... 395/582, 584, 395/586, 591; 712/235, 239, 237, 244

[56] References Cited

U.S. PATENT DOCUMENTS

| | | |
|---|---|---|
| 4,912,707 | 3/1990 | Kogge et al. . |
| 4,970,641 | 11/1990 | Hester et al. ............................ 395/400 |
| 4,985,825 | 1/1991 | Webb, Jr. et al. ...................... 395/425 |
| 5,193,156 | 3/1993 | Yoshida et al. . |
| 5,193,158 | 10/1991 | Kinney et al. ........................... 395/375 |
| 5,226,126 | 7/1993 | McFarland et al. ..................... 395/375 |
| 5,297,263 | 3/1994 | Ohtsuka et al. ......................... 395/375 |
| 5,355,457 | 10/1994 | Shebanow et al. ...................... 395/375 |
| 5,367,705 | 11/1994 | Sites et al. ............................... 395/800 |
| 5,694,564 | 12/1997 | Alsup et al. . |
| 5,740,393 | 4/1998 | Vidwans et al. ......................... 395/391 |

FOREIGN PATENT DOCUMENTS

| | | |
|---|---|---|
| 0 365 322 | 4/1990 | European Pat. Off. . |
| 0 588 252 | 3/1994 | European Pat. Off. . |

OTHER PUBLICATIONS

Instruction Issue Logic for High–Performance, Interruptable, Multiple Functional Unit, Pipelined Computers Sohi IEEE Trans on Comp vol. 39 No. 3 Mar. 1990 pp. 349–359.

Hwu & Patt, "Checkpoint Repair for High Performance Out–of–Order Execution Machines" Dec. 1987 IEEE Transactions on Computers vol. C36 pp. 1496–1514.

Hwu & Patt "Checkpoint Repair for Out–of–Order Execution Machines" 1987 pp. 18–26.

"A Multiple Out–of–Order Instruction Issuing System for Superscalar Processors" Harry Dwyer III Aug. 1991 Chapter 7.

"Checkpoint Repair for High–Performance Out–of–Order Execution Machines", *IEEE Transactions on Computers,* (C6), Wen–Mei W. Hwu and Yale N. Patt, Dec. 1987, pp. 1496–1514.

(List continued on next page.)

*Primary Examiner*—Paul R. Myers
*Attorney, Agent, or Firm*—Blakely, Sokoloff, Taylor & Zafman

[57] ABSTRACT

A method and circuitry for coordinating exceptions in a processor. The processor generates a result data value and an exception data value for each instruction wherein the exception data value specifies whether the corresponding instruction causes an exception. The processor commits the result data values to an architectural state of the processor in the sequential program order, and fetches an exception handler to processes the exception if the exception is indicated by one of the exception data values. The processor fetches an asynchronous event handler to processes an asynchronous event if the asynchronous event is detected while the result data values are committed to the architectural state of the processor.

16 Claims, 10 Drawing Sheets

OTHER PUBLICATIONS

Sohi, et al.; *Instruction Issue Logic for High–Performance, Interruptable Pipelined Processors*; Computer Sciences Dept., University of Wisconsin–Madison, ACM 1987; pp. 27–34.

Weiss, et al.; Instruction Issue Logic in Pipelined Supercomputers; IEEE Transactions on Computers, vol. c–33, No. 11, Nov. 1984; pp. 1013–1022.

Robert M. Keller; Look–Ahead Processors; Computing Surveys, vol.7, No. 4, Dec. 1975; pp. 177–195.

Riseman, et al.; The Inhibition of Potential Parallelism by Conditonal Jumps; IEEE Transactions of Computers, Dec. 1972; pp. 1405–1411.

Tjaden, et al.; Detection and Parallel Execution of Independent Instructions; IEEE Transactions on Computers, vol. C–19, No. 10, Oct. 1970; pp. 889–895.

Foster, et al.; Percolation of Code to Enhance Parallel Dispatching and Execution; IEEE Transactions on Computers, Dec. 1972; pp. 1411–1415.

James E. Smith; Implementation of Precise Interrupts in Pipelined Processors; IEEE, 1985; pp. 36–44.

Hwu, et al.; HPSm2: A Redefined Single–ship Microengine: System Sciences; The Computer Society of the IEEE 1988; pp. 30–39.

Hwu, et al.; Exploiting Horizontal and Vertical Concurrency via the HPSm Microprocessor; ACM 089791–250–0/87/0012/0154 1987; pp. 154–161.

Hwu, et al.; Design Choices for the PHSm Microprocessor Chip; Computer Science Sivision, University of California, Berkeley; Proc. of the 20th Annual Hawaii International Conf. on System Sciences, Kona, Jan. 1987; (seven pages).

Hwu, et al.; HPSm, a High Performance Retricted Data Flow Architecture Having Minimal Functionality; IEEpp. 297–306.

Gharachorloo, et al.; Detecting Violations of Sequential Consistency; to appear in SPAA '91; pp. 1–11.

Gharachorloo, et al.; Two Techniques to Enhance the Performance of Memory Consistency Models; To appear in ICPP '91; pp.

R.M. Tomasulo; An Efficient Algorithm for Exploiting Multiple Arithmetic Units; *IBM Technical Journal*, vol. 11, Jan. 1967 pp. 25–33.

V. Popescu, et al., "The Metaflow Architecture", IEEE Micro, 1991, pp. 10–13, and 63–73.

Mike Johnson, "Superscalar Microprocessor Design", Prentice Hall, 1991.

EXCEPTION HANDLING IN A PROCESSOR THAT PERFORMS SPECULATIVE OUT-OF-ORDER INSTRUCTION EXECUTION

This is a continuation of application Ser. No. 08/417,463, filed Apr. 5, 1995, now abandoned, which is a continuation of application Ser. No. 08/160,495, filed Dec. 1, 1993 now abandoned.

BACKGROUND OF THE INVENTION

1. Field of the Invention

The present invention pertains to the field of computer systems. More particularly, this invention relates to coordinating exception handling in a processor that performs speculative out-of-order instruction execution.

2. Background

Typical prior computer processors implement in-order instruction execution pipelines. An in-order processor usually fetches an instruction stream from a memory, and executes each instruction in the instruction stream according to a sequential program order. Such in-order instruction execution ensures that data dependencies among the instructions are strictly observed.

A processor may perform out-of-order instruction execution to increase instruction execution performance. Such a processor executes ready instructions in the instruction stream ahead of earlier instructions in the program order that are not ready. A ready instruction is typically an instruction having fully assembled source data and available execution resources.

Such out-of-order execution improves processor performance because the instruction execution pipeline of the processor does not stall while awaiting source data or execution resources for a non ready instruction. For example, an instruction in the instruction stream may require source data from a processor register, wherein the processor register is loaded by a pending external memory fetch operation. Such an instruction awaiting the results of the external memory fetch does not stall the execution of later instructions in the instruction stream that are ready to execute.

A processor may also perform speculative instruction execution to increase instruction execution performance. Such a processor typically determines a speculative execution path through a program by predicting the result of branch instructions. Such a processor fetches an instruction stream from a memory, predicts a branch result for each branch instruction, and continues fetching and executing the instruction stream according to the predicted branch result. Such speculative execution increases processor performance because the instruction fetch pipeline does not stall during the resolution of branch instructions.

A processor that performs both speculative and out-of-order instruction execution generates speculative result data in an out-of-order sequence in relation to the original program order. The result data is out-of-order because the instructions that cause generation of the result data are executed out-of-order. The result data is speculative until the branch prediction or predictions that caused speculative execution of the instructions is resolved.

Such a speculative out-of-order processor requires a mechanism for coordinating exceptions that occur during the speculative out-of-order execution of the instructions. The exceptions include, for example, software traps and software faults. An example of a software fault is a page fault during a memory access. An example of a trap is a data breakpoint trap. In addition, such a speculative out-of-order processor must coordinate the handing of asynchronous events such as interrupts.

A speculative out-of-order processor detects such exceptions out-of-order in relation to the original program order because the instructions causing the exceptions are executed out-of-order. Nevertheless, the programming model for such a processor typically requires processing of exceptions in the sequential program order. Moreover, such a programming model typically prohibits exceptions caused by instructions executed due to a mispredicted branch. As a consequence, such a speculative out-of-order processor requires a mechanism for processing exceptions and asynchronous events consistent with existing programming models for the processor.

SUMMARY AND OBJECTS OF THE INVENTION

One object of the present invention is to coordinate the processing of exceptions in a processor that performs speculative branch prediction and out-of-order instruction execution.

Another object of the present invention is to coordinate the processing of asynchronous events in a processor that performs speculative branch prediction and out-of-order instruction execution.

Another object of the present invention is to coordinate the processing of exceptions and asynchronous events by logging the exceptions with the corresponding result data during instruction execution and by testing for the exceptions and asynchronous events at the point at which the result data is committed to an architectural state.

A further object of the present invention is to coordinate the processing of exceptions and asynchronous events in a processor that performs speculative branch prediction and out-of-order instruction execution wherein each instruction is decoded into one or more micro-ops that are executed according to the availability of execution resources in the processor.

These and other objects of the invention are provided by a method for coordinating exceptions in a processor. The processor fetches an instruction stream according to a sequential program order, wherein the instruction stream comprises a series of instructions. The processor generates a result data value and an exception data value for each instruction by executing each instruction according to availability of execution resources in the processor. Each exception data value specifies whether the corresponding instruction causes an exception.

The processor commits the result data values to an architectural state of the processor in the sequential program order. The processor fetches an exception handler to process the exception if the exception is indicated by one of the exception data values at the time the corresponding result data value would have been committed to the architectural state of the processor. The processor fetches an appropriate asynchronous event handler to process an asynchronous event if the asynchronous event is detected.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
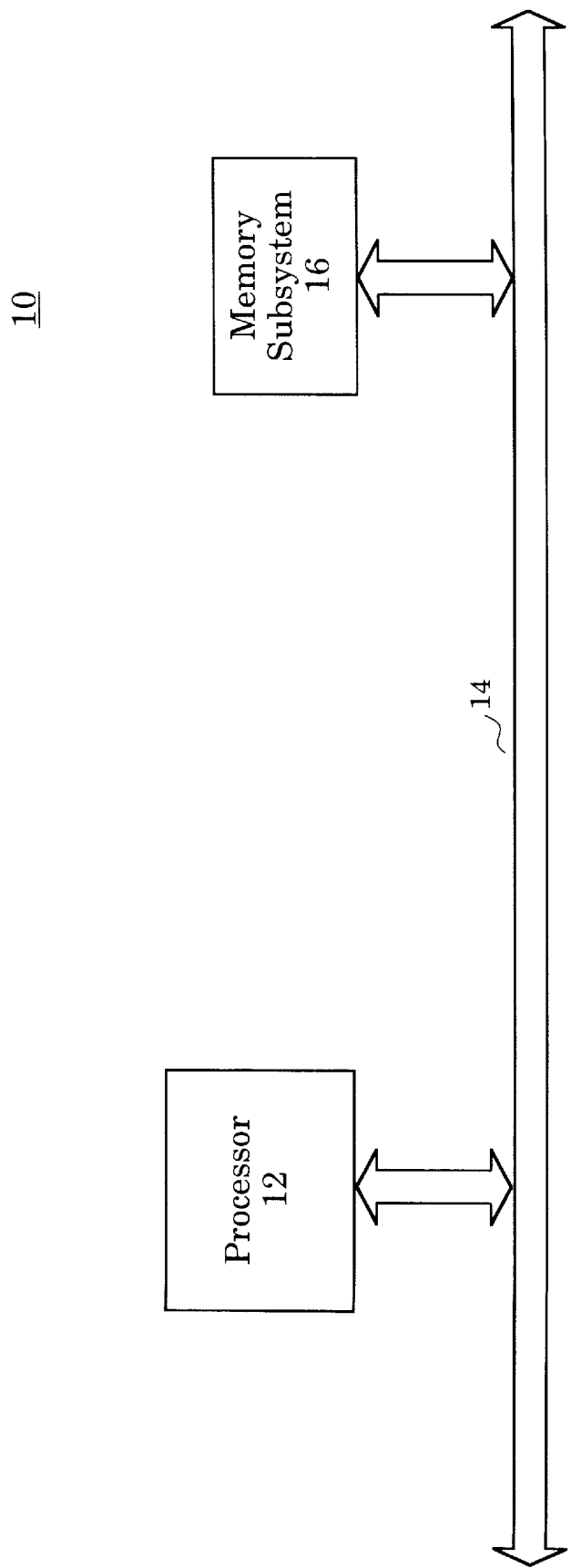
FIG. 1 illustrates a computer system comprising a processor, and a memory subsystem.

FIG. 1 illustrates a computer system 10. The computer system 10 comprises a processor 12 and a memory subsystem 16. The processor 12 and the memory subsystem 16 communicate over a host bus 14.

The processor 12 fetches a stream of instructions from the memory subsystem 16 over the host bus 14 through the cache circuit 24. The processor 12 executes the stream of instructions and maintains data storage in the memory subsystem 16.

Figure 2:
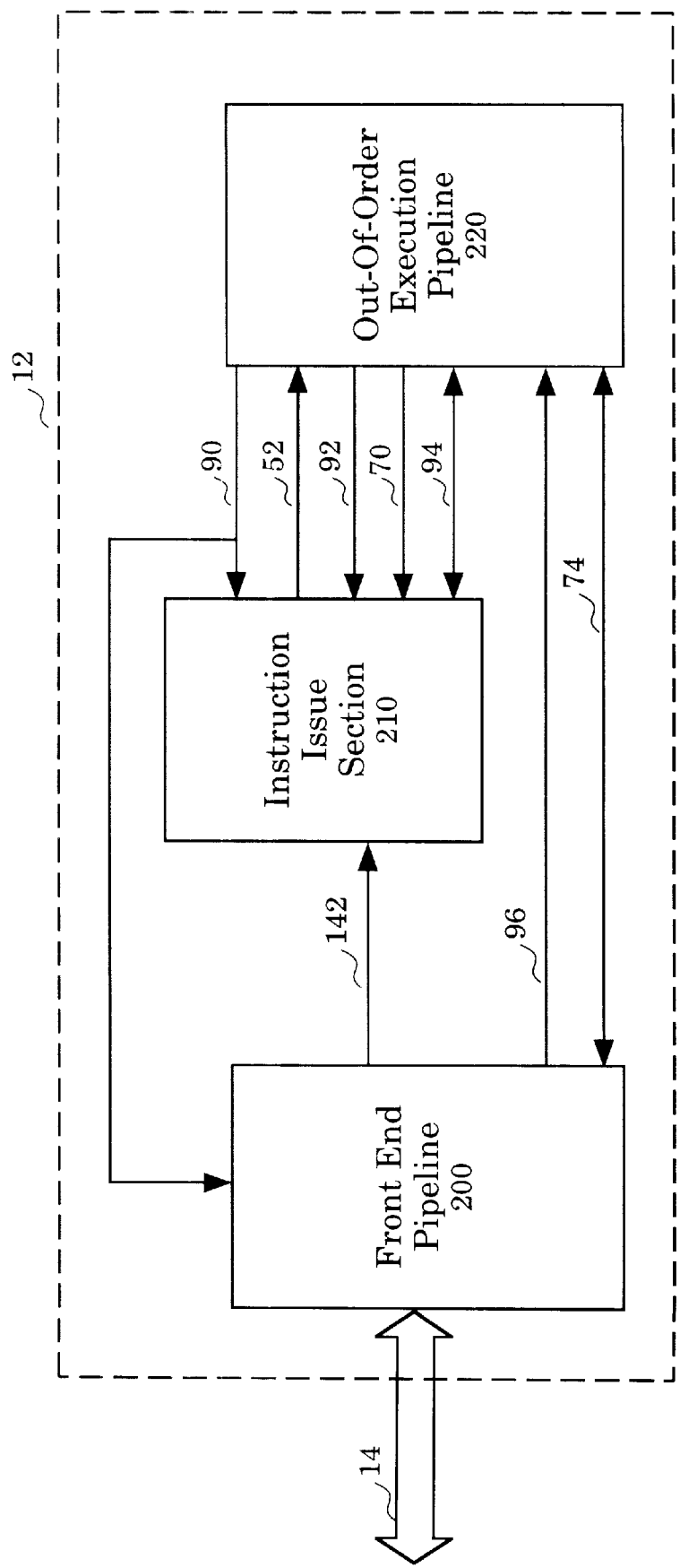
FIG. 2 illustrates the processor for one embodiment which comprises a front end pipeline, an instruction issue section, and an out-of-order execution pipeline.

FIG. 2 illustrates the processor 12 for one embodiment. The processor 12 comprises a front end pipeline 200, an instruction issue section 210, and an out-of-order execution pipeline 220.

The front end pipeline 200 fetches instructions over the host bus 14, performs speculative branch prediction for the instructions, and transfers an in-order stream of instructions to the instruction issue section 210 over a bus 142. The front end pipeline 200 senses external interrupts on the host bus 14 and transfers corresponding interrupt vectors for the external interrupts over an interrupt vector bus 96. The front end pipeline 200 communicates with the out-of-order execution pipeline 220 over a memory access bus 74 during execution of memory load and store operations.

For one embodiment, the instructions fetched by the front end pipeline 200 comprise Intel Architecture Microprocessor instructions. The Intel Architecture Microprocessor instructions operate on a set of architectural registers, including an EAX register, an EBX register, an ECX register, and an EDX register, etc., as well as floating-point registers.

The instruction issue section 210 receives the in-order stream of instructions over the bus 142, and generates an in-order stream of physical micro operations, hereinafter referred to as physical micro-ops. The instruction issue section 210 generates one or more physical micro-ops for each instruction fetched from the memory subsystem 16.

The instruction issue section 210 generates the in-order physical micro-ops by decoding the instructions into logical micro-ops and by renaming the logical register sources and destinations of the logical micro-ops. The instruction issue section 210 tracks the available resources in the out-of-order execution pipeline 220, and assigns the available resources to the physical micro-ops. The instruction issue section 210 transfers the in-order stream of physical micro-ops over a physical micro-op bus 52.

The physical micro-ops are micro operations that perform the function of the corresponding instruction. The physical micro-ops specify arithmetic and logical operations as well as load and store operations to the memory subsystem 16. Each physical micro-op may include 0, 1, or 2 register source operands and 0 or 1 immediate operands. The register sources of the physical micro-ops specify physical registers contained in the out-of-order pipeline 220 that buffer speculative data and committed state registers in the out-of-order pipeline 220 that contain the committed architectural state of the processor 12.

The out-of-order execution pipeline 220 receives the in-order physical micro-ops over the physical micro-op bus 52. The out-of-order execution pipeline 220 executes the physical micro-ops according to the availability of register source data and execution resources.

The out-of-order execution pipeline 220 buffers the speculative result data and the speculative fault status from the out-of-order execution. The out-of-order execution pipeline 220 retires the speculative result data to an architectural state in the same order as the corresponding physical micro-ops are issued by the front end pipeline 200 and checks for exceptions at that time.

The out-of-order execution pipeline 220 signals exceptions by transferring exception vectors to the instruction issue section 210 over an exception vector bus 92. Each exception vector specifies the type of exception. The out-of-order execution pipeline 220 issues a restart control signal 90 to the instruction issue section 210 and the front end pipeline 200 to halt the incoming instruction stream if an exception is detected.

The instruction issue section 210 retrieves exception information over a control register bus 94 from the out-of-order execution pipeline 220. The instruction issue section 210 implements routines for handling the exceptions, and accordingly issues micro-ops to the out-of-order execution pipeline 220.

Figure 3:
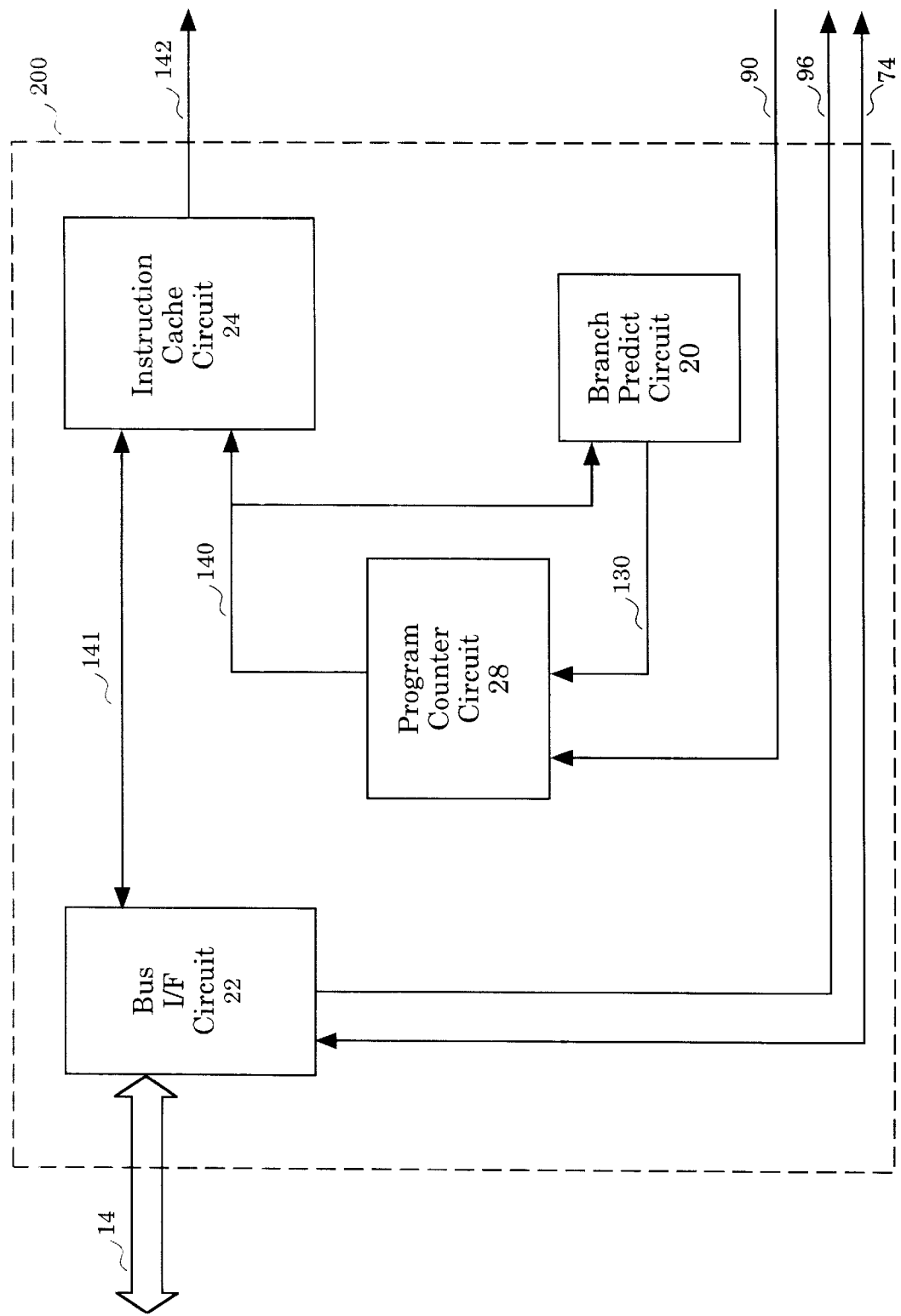
FIG. 3 illustrates the front end pipeline for one embodiment which comprises a bus interface (I/F) circuit, an instruction cache circuit, a program counter circuit, an instruction decode circuit, and a branch predict circuit.

FIG. 3 illustrates the front end pipeline 200 for one embodiment. The front end pipeline 200 comprises a bus interface (I/F) circuit 22, an instruction cache circuit 24, a program counter circuit 28, an instruction decode circuit 26, and a branch predict circuit 20.

The instruction cache circuit 24 interfaces to the host bus 14 through the bus interface circuit 22. The instruction cache circuit 24 fetches instructions from the memory subsystem 16 through the bus interface circuit 22 and over a bus 141. The instruction cache circuit 24 buffers the instructions fetched from the memory subsystem 16.

The bus interface circuit 22 senses interrupts on the host bus 14. The bus interface circuit 22 transfers interrupt vectors over the interrupt vector bus 96 to the out-of-order execution pipeline 220. The interrupt vectors on the interrupt vector bus 96 identify the external interrupts on the host bus 14.

The bus interface circuit 22 enables the out-of-order execution pipeline 220 to communicate over the host bus 14 through the memory access bus 74. The out-of-order execution pipeline 220 accesses the memory subsystem 16 through the bus interface circuit 22 during execution of memory load and store operations.

The program counter circuit 28 controls the sequence of instruction flow from the instruction cache circuit 24. The program counter circuit 28 transfers instruction addresses over a program counter bus 140. The instruction addresses cause the instruction cache circuit 24 to transfer a stream of instructions to the instruction decode circuit 26 over the bus 142 in a sequential program order.

The program counter circuit 28 receives the restart control signal 90 from the out-of-order execution pipeline 220 indicating detection of an exception. The restart control signal 90 causes the program counter circuit 28 to halt the transfer of instruction addresses over the program counter bus 140 and halt the instruction stream from the instruction cache circuit 24.

The branch predict circuit 20 predicts the branches in the stream of instructions accessed from the instruction cache circuit 24. The branch predict circuit 20 receives the instruction addresses on the program counter bus 140, and generates predicted target addresses based upon the instruction addresses. The branch predict circuit 20 transfers the predicted target addresses to the program counter circuit 28 over a branch target bus 130.

Figure 4:
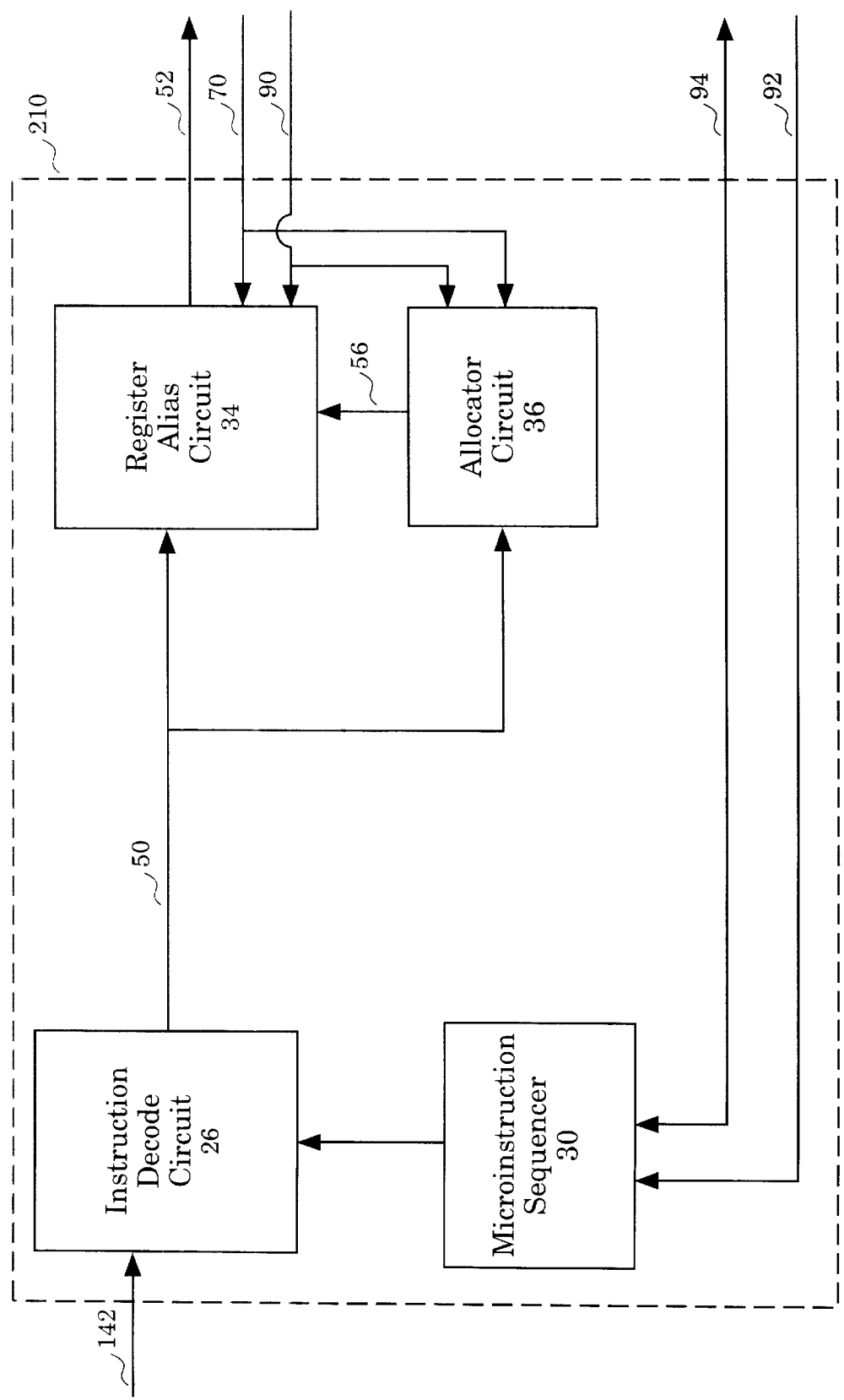
FIG. 4 illustrates the instruction issue section for one embodiment which comprises an instruction decode circuit, a microinstruction sequencer, a register alias circuit, and an allocator circuit.

FIG. 4 illustrates the instruction issue section 210 for one embodiment. The instruction issue section 210 comprises an instruction decode circuit 26, a microinstruction sequencer 30, a register alias circuit 34, and an allocator circuit 36.

The instruction decode circuit 26 receives the in-order stream of instructions from the instruction cache circuit 24 over the bus 142, and converts the instructions into an in-order stream of logical micro-ops. The instruction decode circuit 26 generates one or more logical micro-ops for each instruction from the instruction cache circuit 24.

The logical micro-ops generated by the instruction decode circuit 26 are micro operations that perform the function of the corresponding instruction. The logical micro-ops specify arithmetic and logical operations as well as load and store operations to the memory subsystem 16. Each logical micro-op may specify register source operands and/or immediate data operands.

The instruction decode circuit 26 transfers the in-order stream of logical micro-ops to the register alias circuit 34 over a logical micro-op bus 50. For one embodiment, the instruction decode circuit 26 issues up to four in-order logical micro-ops during each clock cycle of the processor 12.

Each logical micro-op on the logical micro-op bus 50 comprises an opcode, a pair of logical register sources and a logical register destination, a set of flow markers and an instruction pointer delta value. The opcode specifies a function for the corresponding logical micro-op. Each logical register source may specify a register source for operand data, and the logical register destination may specify a register destination for result data for the corresponding logical micro-op. The register logical register sources and the logical register destinations of the logical micro-ops correspond to the architectural registers of the original instructions.

The flow markers indicate the boundaries of the original instructions corresponding to the logical micro-ops. The original instructions are also referred to as macroinstructions. The flow markers include a beginning of macroinstruction (BOM) flow marker, and an end of macroinstruction (EOM) flow marker. The BOM flow marker indicates that the corresponding logical micro-op is the first logical micro-op of a macroinstruction, and the EOM marker indicates that the corresponding logical micro-op is the last logical micro-op of the macroinstruction. If a macroinstruction maps to only one logical micro-op, then that logical micro-op carries both the BOM and the EOM flow markers.

The instruction pointer delta value for a logical micro-op indicates the length in bytes of the corresponding macroinstruction. For example, each logical micro-op corresponding to a four byte macroinstruction has a macroinstruction pointer delta value equal to four.

The register alias circuit 34 receives the in-order logical micro-ops over the logical micro-op bus 50, and generates a corresponding set of in-order physical micro-ops by renaming the logical register sources and the logical register destinations of the logical micro-ops. The allocator circuit 36 tracks the available resources the out-of-order execution pipeline 220. The allocator circuit 36 assigns resources in the out-of-order execution pipeline 220 to the physical micro-ops transferred over the physical micro-op bus 52.

The register alias circuit 34 implements a register alias table that specifies whether the current state for each architectural register is speculatively held in the out-of-order execution pipeline 220 or is retired to a committed state register in the out-of-order execution pipeline 220.

The register alias table enables logical to physical register renaming by mapping the logical register sources and destinations to the physical register sources and destinations. The physical register sources and destinations of the physical micro-ops specify reorder buffer (ROB) entries and committed state registers of the out-of-order execution pipeline 220.

The entries in the register alias table correspond to the architectural registers of the original instruction stream. For one embodiment, the entries of the register alias table correspond to the EAX, EBX, ECX, and EDX, etc. registers of the Intel Architecture Microprocessor.

Each entry in the register alias table stores a ROB pointer. The ROB pointer specifies a ROB entry in the out-of-order execution pipeline 220 assigned to buffer the speculative result data for the corresponding architectural register. Each entry in the register alias table also stores a real register file valid (rrfv) flag that indicates whether the speculative result data for the corresponding architectural register is contained in the appropriate committed state register in the out-of-order execution pipeline 220.

The allocator circuit 36 transfers a set of assigned physical register destinations pdst_0 through pdst_3 to the register alias circuit 34 over a physical destination bus 56. The assigned physical register destinations pdst_0 through pdst_3 specify ROB entries in the out-of-order execution pipeline 220 for buffering speculative results for the physical micro-ops. The assigned physical register destinations pdst_0 through pdst_3 are stored in the register alias table and are used by the register alias circuit 34 to rename the logical register destinations of the logical micro-ops into physical register destinations.

The allocator circuit 36 assigns the ROB entries of the out-of-order execution pipeline 220 to the physical micro-ops in the same order that logical micro-ops are received over the logical micro-op bus 50. The allocator circuit 36 maintains an allocation pointer for allocating ROB entries. The allocator circuit 36 receives retirement pointers and valid signals over the retire control bus 70, and accordingly deallocates retired ROB entries. The deallocated ROB entries become available for reallocation.

The register alias circuit 34 receives a set of in-order logical micro-ops lmop_0 through lmop_3 over the logical micro-op bus 50 during each pipeline clock of the processor 12. Each logical micro-op lmop_0 through lmop_3 comprises an opcode, a pair of logical register sources lsrc1 and lsrc2, and a logical register destination ldst, a set of flow markers, and an instruction pointer delta value. The logical register sources and the logical register destination each specify an architectural register of the original stream of instructions.

The register alias circuit 34 transfers a corresponding set of in-order physical micro-ops pmop_0 through pmop_3 over the physical micro-op bus 52. Each physical micro-op comprises the opcode of the corresponding logical micro-op, a pair of physical register sources psrc1 and psrc2, a physical register destination pdst, and the flow markers and the instruction pointer delta value of the corresponding logical micro-op. Each physical register destination pdst specifies a ROB entry in the out-of-order execution pipeline 220 to hold speculative result data for the corresponding physical micro-op.

The physical register sources psrc1 and psrc2 each specify a ROB entry or a committed state register in the out-of-order execution pipeline 220. Each physical register sources psrc1 and psrc2 on the physical micro-op bus 52 includes a corresponding rrfv flag. The rrfv flag indicates whether the corresponding physical register source specifies a ROB entry or a committed state register.

The register alias circuit 34 generates the physical micro-ops by mapping the logical register sources of the logical micro-ops to the ROB entries and the committed state registers of the out-of-order execution pipeline 220 according to the register alias table. The register alias circuit 34 merges assigned physical register destinations pdst_0 through pdst_3 into the physical register destinations pdst of the physical micro-ops pmop_0 through pmop_3.

The register alias circuit 34 determines a physical register source for a physical micro-op by reading the register alias table entry specified by the corresponding logical register source. If the rrfv flag of the specified register alias table entry is not set, then the register alias circuit 34 transfers the ROB pointer from the specified register alias table entry along with the corresponding rrfv flag over the physical micro-op bus 52 as the physical register source. If the rrfv flag of the specified entry is set, then the register alias circuit 34 transfers a pointer to the committed state register in the out-of-order execution pipeline 220 that corresponds to the logical register source as the physical register source, and transfers the corresponding rrfv flag over the physical micro-op bus 52.

The register alias circuit 34 stores the physical register destinations pdst_0 through pdst_3 into the ROB pointer fields of the register alias table entries specified by the logical register destinations ldst of the logical micro-ops lmop_0 through lmop_3, and clears the corresponding rrfv flags. The clear rrfv flag indicates that the current state of the corresponding architectural registers are assigned to ROB entries in the out-of-order execution pipeline 220 as specified by the corresponding ROB pointers.

For example, the register alias circuit 34 generates the physical register source psrc1 for the physical micro-op pmop_0 by reading the register alias table entry specified by the logical register source lsrc1 of the lmop_0. If the rrfv flag of the specified register alias table entry is not set, then the register alias circuit 34 transfers the ROB pointer from the specified register alias table entry along with the corresponding rrfv flag over the physical micro-op bus 52 as the physical register source psrc1 for the pmop_0. If the rrfv flag of the specified register alias table entry is set, then the register alias circuit 34 transfers a pointer to the committed state register that corresponds to the logical register source lsrc1 along with the rrfv flag over the physical micro-op bus 52 as the physical register source psrc1 for the pmop_0.

The register alias circuit 34 generates the physical register source psrc2 for the physical micro-op pmop_0 by reading the register alias table entry specified by the logical register source lsrc2 of the lmop_0. If the rrfv flag of the specified register alias table entry is not set, then the register alias circuit 34 transfers the ROB pointer from the specified entry along with the corresponding rrfv flag over the physical micro-op bus 52 as the physical register source psrc2 for the pmop_0. If the rrfv flag is set, then the register alias circuit 34 transfers a pointer to the committed state register that corresponds to the logical register source lsrc2 along with the rrfv flag over the physical micro-op bus 52 as the physical register source psrc2 for the pmop_0.

The register alias circuit 34 stores the allocated physical register destination pdst_0 into the ROB pointer field of the register alias table entry specified by the logical register destination ldst of the lmop_0, and clears the corresponding rrfv flag. The register alias circuit 34 also transfers the allocated physical register destination pdst_0 over the physical micro-op bus 52 as the physical destination pdst for the physical micro-op pmop_0.

The register alias circuit 34 receives retirement pointers and valid signals over the retire control bus 70. The register alias circuit 34 accordingly updates the register alias table entries corresponding to the retired ROB entries. The register alias circuit 34 updates the rrfv flags of the register alias table entries for the retired ROB entries to indicate that the corresponding architectural registers are held in a committed state register in the out-of-order execution pipeline 220.

The microinstruction sequencer 30 implements microcode for handling exceptions detected in the out-of-order execution pipeline 220 during execution of micro-ops that correspond to instructions fetched from the memory subsystem 16. The microinstruction sequencer 30 also implements microcode that emulates the interrupt service mechanism for the processor 12. For one embodiment, the microinstruction sequencer 30 emulates the interrupt service mechanism of the Intel Microprocessor Architecture.

The microinstruction sequencer 30 receives an exception vector from the out-of-order execution pipeline 220 over the exception vector bus 92 if an exception is detected. The microinstruction sequencer 30 accesses exception information over the control register bus 94, and then issues micro-ops to the instruction decode circuit 26 to handle the specified exception. The exception handling micro-ops issued by the microinstruction sequencer 30 are decoded and renamed and executed in the out-of-order execution pipeline 220.

Figure 5:
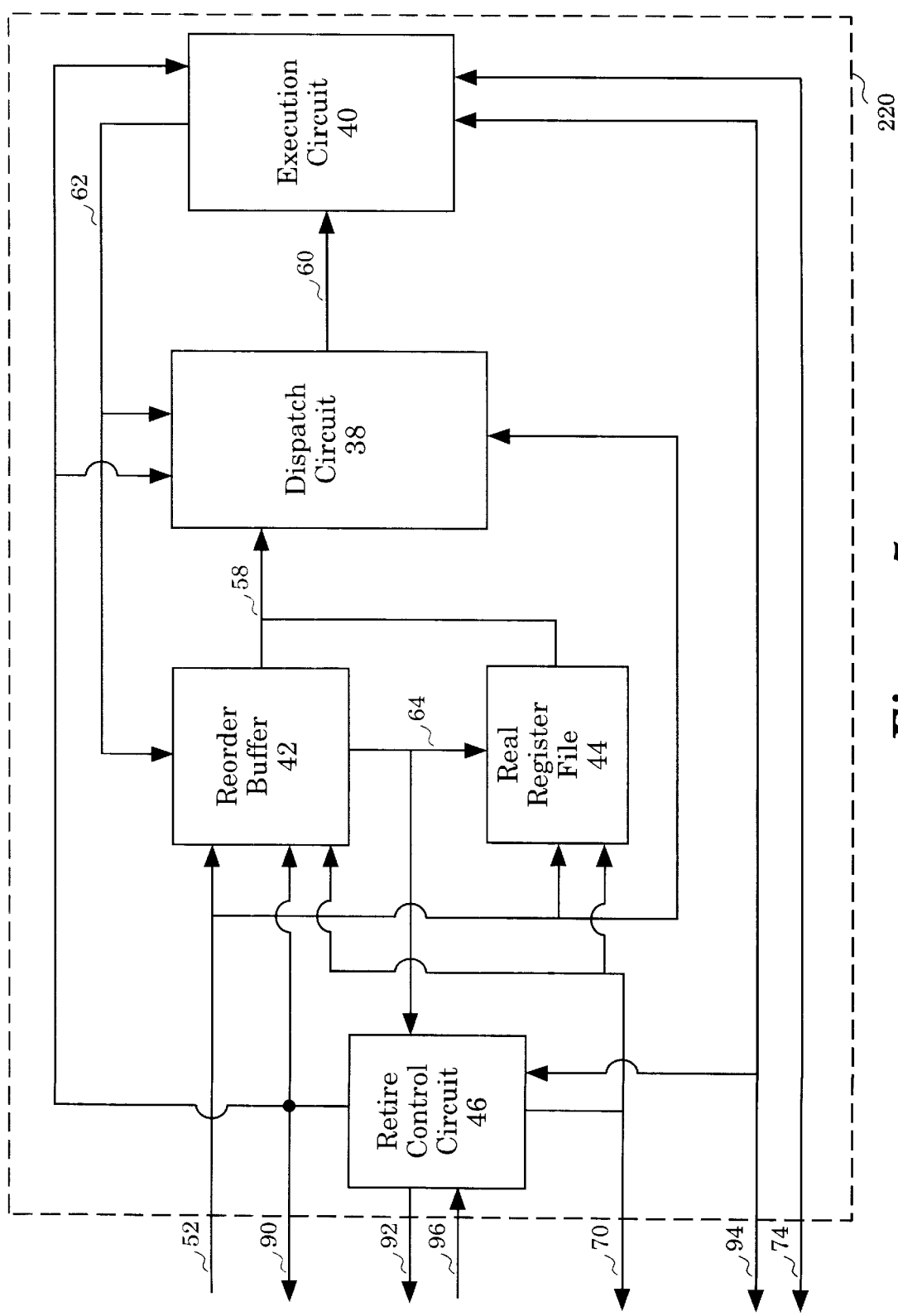
FIG. 5 illustrates the out-of-order execution pipeline for one embodiment which comprises a reorder buffer, a real register file, a retire control circuit, a dispatch circuit, and an execution circuit.

FIG. 5 illustrates the out-of-order execution pipeline 220 for one embodiment. The out-of-order execution pipeline 220 comprises a reorder buffer 42, a real register file 44, a retire control circuit 46, a dispatch circuit 38, and an execution circuit 40.

The dispatch circuit 38 buffers the physical micro-ops awaiting execution by an execution circuit 40. The dispatch circuit 38 receives the opcodes and physical register destinations for the physical micro-ops over the physical micro-op bus 52 and stores the opcodes and physical register destinations into reservation station entries assigned by the allocator circuit 36. The dispatch circuit 38 assembles source data for the physical micro-ops, and dispatches the physical micro-ops to appropriate execution units in the execution circuit 40 according to availability of source data and execution resources.

The reorder buffer 42 contains the ROB entries that buffer speculative results for the physical micro-ops. Each ROB entry in the reorder buffer 42 can buffer either integer or floating-point result data values. Each ROB entry contains a valid flag that indicates whether the corresponding result data value is valid.

The real register file 44 contains committed state registers that hold the committed state of the architectural registers of the original stream of instructions. The committed result data values in the committed state registers always provide valid source data. Each physical register source specifies either a ROB entry or a committed state register.

The reorder buffer 42 and the real register file 44 receive the physical micro-ops over the physical micro-op bus 52. The physical register sources psrc1 and psrc2 of each physical micro-op can each specify either a ROB entry in the reorder buffer 42 or a committed state register in the real register file 44. Each physical register source psrc1 and psrc2 on the physical micro-op bus 52 includes a real register file valid (rrfv) flag that indicates whether the corresponding physical register source specifies a ROB entry or a committed state register.

The reorder buffer 42 reads the result data values and corresponding valid flags from the ROB entries specified by the physical register sources psrc1 and psrc2 of each physical micro-op pmop_0 through pmop_3. The reorder buffer 42 transfers the result data values and corresponding valid flags to the dispatch circuit 38 over a source data bus 58.

The real register file 44 reads the result data values from the committed state registers specified by the physical register sources psrc1 and psrc2 of each physical micro-op pmop_0 through pmop_3. The real register file 44 transfers the result data values to the dispatch circuit 38 over the source data bus 58. The result data values from the real register file 44 have corresponding valid flags that indicate valid data.

The physical register destinations of the physical micro-ops on the physical micro-op bus 52 specify ROB entries in the reorder buffer 42 for buffering result data from execution of the physical micro-ops. The reorder buffer 42 clears the ROB entries specified by the physical register destinations pdst of each physical micro-op pmop_0 through pmop_3. The reorder buffer 42 then stores the logical register destinations of the physical micro-ops into the newly allocated ROB entries.

The dispatch circuit 38 receives the source data values and corresponding valid flags over the source data bus 58. The dispatch circuit 38 stores the source data values and corresponding valid flags into the reservation station entries assigned to the corresponding physical micro-ops.

The dispatch circuit 38 also receives source data values and corresponding valid flags for the pending physical micro-ops from the execution circuit 40 over a result bus 62 during a write back of result data values from the execution circuit 40 to the reorder buffer 42. The dispatch circuit 38 stores the write back source data values and corresponding valid flags into the reservation station entries assigned to the corresponding physical micro-ops.

The dispatch circuit 38 schedules the physical micro-ops having completely assembled source data values for execution. The dispatch circuit 38 dispatches the ready physical micro-ops to the execution circuit 40 over a micro-op dispatch bus 60. The dispatch circuit 38 schedules execution of physical micro-ops out-of-order according to the availability of the source data values for the physical micro-ops, and according to the availability of execution unit resources in the execution circuit 40.

The execution circuit 40 writes back the speculative result data values and exception status from the out-of-order execution of the physical micro-ops to the reorder buffer 42 over the result bus 62. The writes back of speculative result data values and exception status by the execution circuit 40 is out-of-order due to the out-of-order dispatching of physical micro-ops by the dispatch circuit 38 and the differing number of processor cycles of the processor 12 required for execution of the differing types of physical micro-ops.

For one embodiment, the execution circuit 40 comprises a set of five execution units, and the dispatch circuit 38 dispatches up to five physical micro-ops concurrently to the execution circuit 40 over the micro-op dispatch bus 60.

The retire control circuit 46 controls a retirement operation during each cycle of the processor 12 pipeline clock. During each retirement operation, the speculative results held in the reorder buffer 42 are committed to an architectural state in the same order as the original logical micro-ops were received. During retirement, the speculative result data values from a sequential set of ROB entries are transferred to the corresponding committed state registers of the real register file 44 over a retire data bus 64.

The retire control circuit 46 controls the retirement of speculative results stored in the reorder buffer 42. During each cycle of the processor 12, the retire control circuit 46 transfers a retirement pointer over the retire control bus 70. The retirement pointer specifies a set of ROB entries in the reorder buffer 42 for a retirement operation. The retirement pointer on the retire control bus 70 causes the reorder buffer 42 to transfer the result data, exception data, flow markers, and instruction pointer delta values from the specified ROB entries over the retire data bus 64.

The retire control circuit 46 receives the result data, exception data, flow markers, and instruction pointer delta values over the retire data bus 64, and determines whether an exception corresponds to any of the retiring micro-ops. The retire control circuit 46 also receives interrupt vectors over the interrupt vector bus 96 indicating any external interrupt. The retire control circuit 46 also receives machine check signals and inputs from external debug pins of the processor 12 over the interrupt vector bus 96. The machine checks include, for example, any parity errors detected during data transfer over the host bus 14.

The retire control circuit 46 transfers an exception vector to the microinstruction sequencer 30 over the exception vector bus 92 if an exception is detected. The retire control circuit 46 issues the restart control signal 90 if an exception is detected. The exceptions specified by the exception vector include such events as faults, traps, software traps, external interrupts, and machine checks.

The restart control signal 90 causes the program counter circuit 28 to halt the incoming instruction stream. The restart control signal 90 clears the speculative result data in the reorder buffer 42. The restart control signal 90 clears the pending physical micro-ops in the dispatch circuit 38 and the physical micro-ops executing in the execution circuit 40. The restart control signal 90 resets the register alias circuit 34 to map all architectural registers to the corresponding committed state registers in the real register file 44. The restart control signal 90 also resets the allocation pointer of the allocator circuit 36 to indicate a cleared reorder buffer 42, and causes deallocation of all the reservation station entries of the dispatch circuit 38.

The retire control circuit 46 then transfers valid signals to the real register file 44 over the retire control bus 70. The valid signals indicate which ROB entries on the retire data bus 64 are written to the corresponding committed state registers. The valid signals cause the real register file 44 to store the specified result data on the retire data bus 64 into the appropriate committed state registers. The valid signals on the retire control bus 70 are also received by the register alias circuit 34 and the allocator circuit 36. The register alias circuit 34 accordingly updates the rrfv flags, and the allocator circuit 36 accordingly deallocates the retired ROB entries.

The retire control circuit 46 determines an updated value of the architectural instruction pointer for the processor 12 during each retirement operation. The retire control circuit 46 determines an updated instruction pointer value according to target addresses generated by retiring branch micro-ops and according to the instruction pointer delta values of the retiring micro-ops. The retire control circuit 46 also stores the exception data corresponding to the micro-op that causes an exception.

The microinstruction sequencer 30 receives the exception vector over the exception vector bus 92. The microinstruction sequencer 30 then accesses the exception data corresponding to the exception and the updated instruction pointer from the retire control circuit 46 over the control register bus 74. The microinstruction sequencer 30 also accesses other information for interrupts and machine checks from the retire control circuit 46 over the control register bus 74 as necessary.

If the exception vector indicates an exception caused by a load or store micro-op, the microinstruction sequencer 30 accesses additional exception information from the execution circuit 40 over the control register bus 74. The additional exception information includes, for example, the memory address for the load or store micro-op causing the exception.

Figure 6:
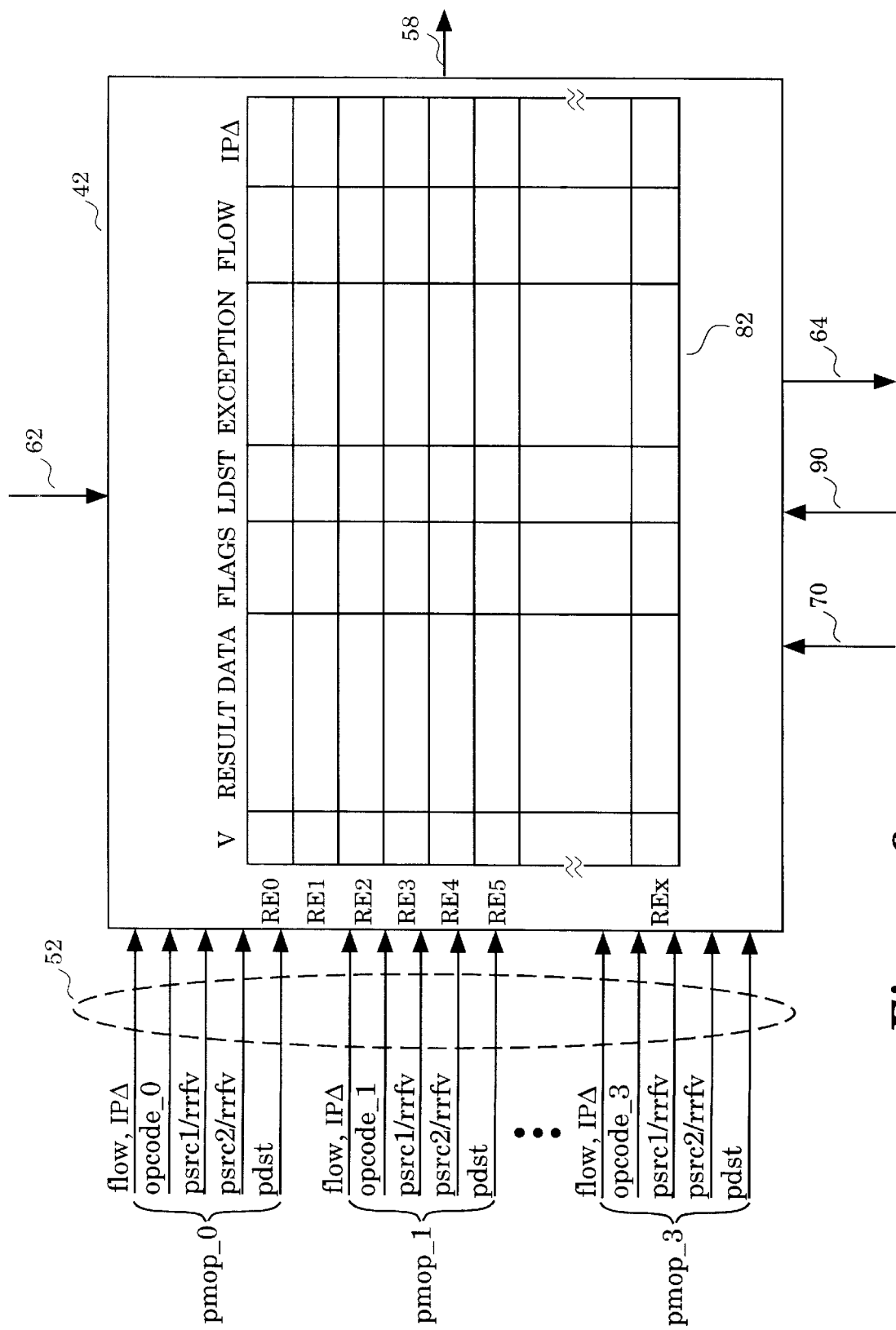
FIG. 6 illustrates the reorder buffer for one embodiment which implements a reorder buffer (ROB) register file comprising a set of ROB entries that buffer speculative result data values from the out-of-order execution of corresponding physical micro-ops.

FIG. 6 illustrates the reorder buffer 42 for one embodiment. The reorder buffer 42 implements a reorder buffer (ROB) register file 82 comprising a set of ROB entries (RE0 through REx). The ROB entries RE0 through REx buffer speculative result data values from the out-of-order execution of corresponding physical micro-ops. Each ROB entry comprises a valid flag (V), a result data value, a set of flags, a logical register destination (LDST), exception data, flow markers, and an instruction pointer delta value (IPΔ).

For one embodiment, the ROB entries RE0 through REx comprise a set of 64 physical registers.

The valid flag of each ROB entry indicates whether the corresponding result data value is valid. The valid flag is set during the result write back to the ROB entry from the execution circuit 40. The reorder buffer 42 clears the valid flag for each newly allocated ROB entry to indicate an invalid result data.

The result data value of each ROB entry is a speculative result from the out-of-order execution of the corresponding physical micro-op. The result data value may be either an integer data value or a floating-point data value. For one embodiment, the result data value field of each ROB entry RE0 through REx comprises 86 bits to accommodate both integer and floating-point data values.

The flags of each ROB entry provide speculative architectural flag information. The speculative architectural flag information is transferred to the architectural flags of the real register file 44 upon retirement of the corresponding ROB entry.

The logical register destination LDST of each ROB entry specifies a committed state register in the real register file 44. The result data value of the corresponding ROB entry is transferred to the committed state register specified by LDST during retirement of the ROB entry.

The exception data of each ROB entry contains exception information from execution of the corresponding physical micro-op. The flow markers of each ROB entry relate the ROB entry to the boundaries of the original instruction, and the instruction pointer delta value (IPΔ) indicates the byte length of the original instruction corresponding to the ROB entry.

The reorder buffer 42 receives the physical micro-ops pmop_0 through pmop_3 over the physical micro-op bus 52. The reorder buffer 42 reads the ROB entries specified by the physical register sources psrc1 and psrc2 of the physical micro-ops from the ROB register file 82. The reorder buffer 42 transfers the result data values and the valid flags from the specified ROB entries over the source data bus 58.

The reorder buffer 42 clears the valid flags of the ROB entries specified by the physical register destinations pdst of the physical micro-ops received over the physical micro-op bus 52. The reorder buffer 42 clears the valid flags to indicate that the corresponding result data value is not valid until the execution circuit 40 writes back results for the physical micro-ops.

The reorder buffer 42 then stores the logical register destinations, the flow markers, and the instruction pointer delta values into the corresponding fields of the ROB entries specified by the physical register destinations of the physical micro-ops. The logical register destination in the LDST field of a ROB entry specifies a committed state register in the real register file 44 for retirement of the corresponding ROB entry.

The reorder buffer 42 receives write back results from the execution circuit 40 over the result bus 62. Each write back result on the result bus 62 comprises a result data value and corresponding valid flag, a physical register destination, and exception data.

The reorder buffer 42 stores the write back results from the execution circuit 40 into the ROB entries specified by the physical register destinations on the result bus 62. The reorder buffer 42 stores the result data value and corresponding valid flag into the result data value and valid flag fields, and stores the exception data into the exception data field of the ROB entry specified by the physical register destination.

The write back valid flag from the execution circuit 40 sets the valid flag in the specified ROB entry. The write back valid flag indicates that the ROB entry contains a valid result data value and exception data from execution of the corresponding physical micro-op.

Figure 7:
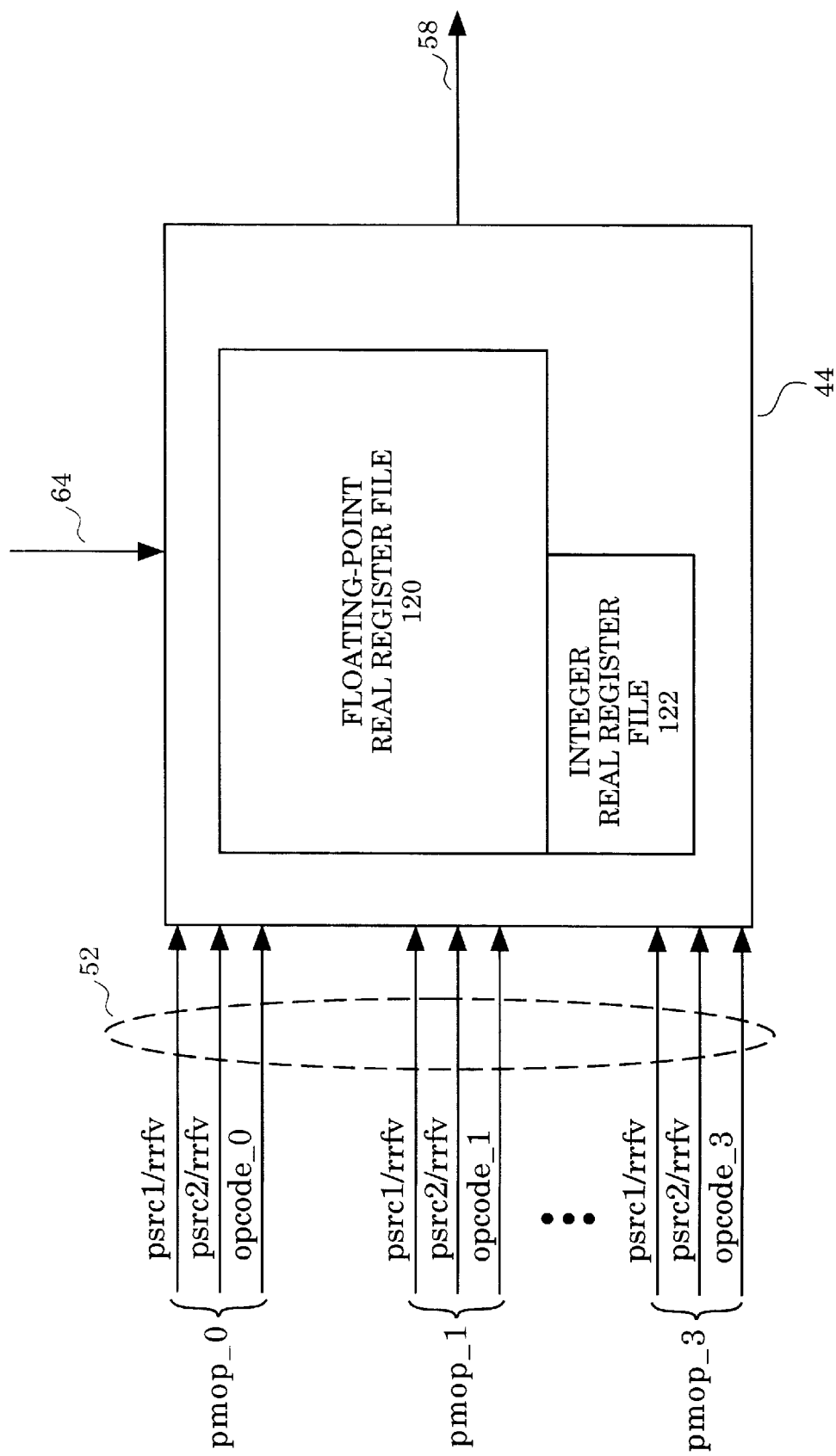
FIG. 7 illustrates the real register file for one embodiment which implements a set of committed state registers that hold committed result data values.

FIG. 7 illustrates the real register file 44 for one embodiment. The real register file 44 implements a set of committed state registers that hold committed result data values. The committed state registers in real register file 44 comprise a floating-point register file 120 and an integer real register file 122.

The committed state registers buffer committed results for the architectural registers of the original stream of instructions. For one embodiment, the committed state registers of the real register file 44 comprise the EAX, EBX, ECX, and EDX registers, etc. and architectural flags of the Intel Architecture Microprocessor.

The real register file 44 receives the physical micro-ops pmop_0 through pmop_3 over the physical micro-op bus 52. The real register file 44 reads the committed state registers specified by the physical register sources psrc1 and psrc2 of the physical micro-ops from the floating-point register file 120 and the integer real register file 122. The real register file 44 transfers the committed result data values from the committed state registers to the dispatch circuit 38 over the source data bus 58. The real register file 44 also transfers a valid flag for each committed result data value to the dispatch circuit 38 over the source data bus 58. The valid flags from the committed state registers always indicate valid source data values.

Figure 8:
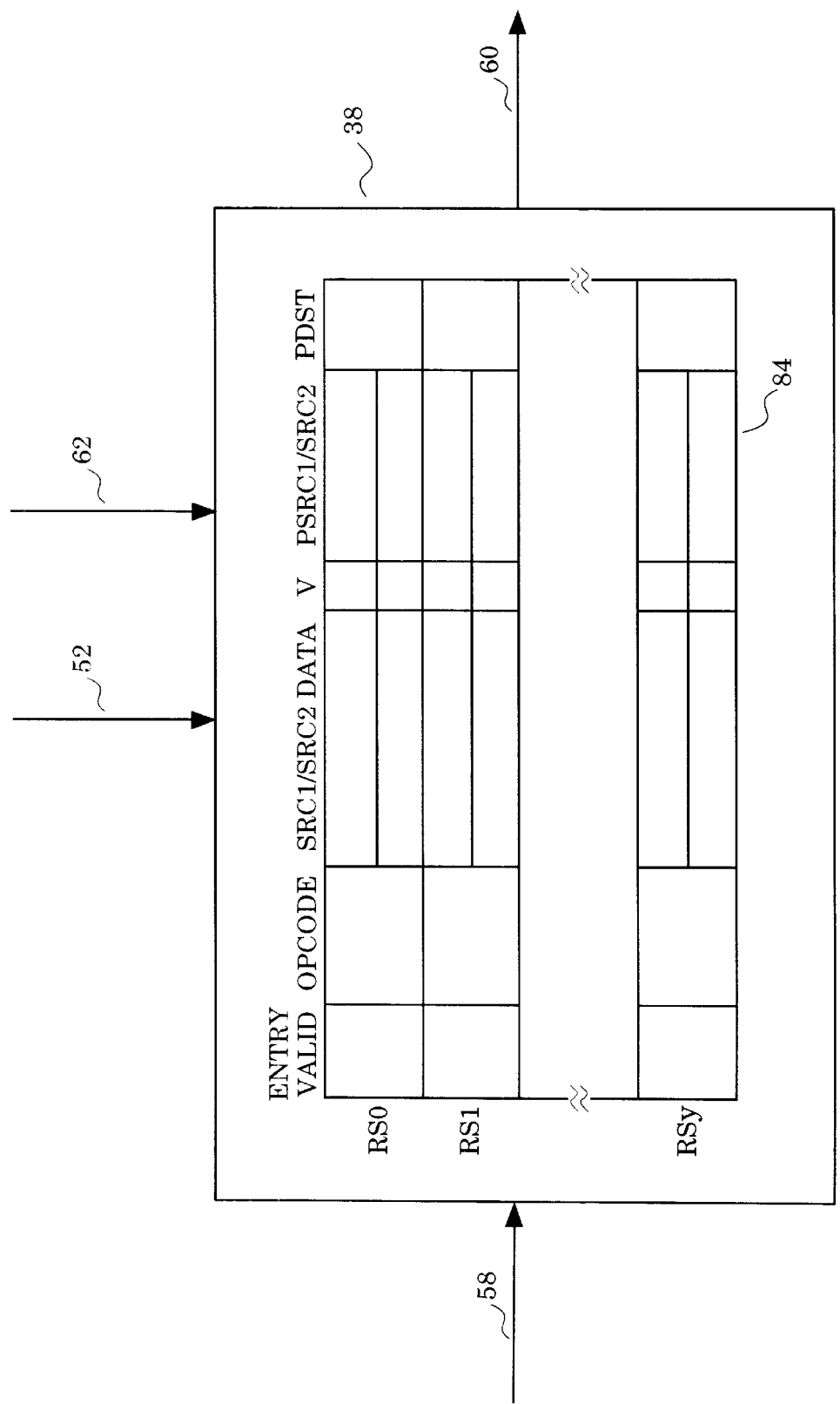
FIG. 8 illustrates the dispatch circuit for one embodiment, and shows a dispatch table comprising a set of reservation station entries RS0 through RSy.

FIG. 8 illustrates the dispatch circuit 38 for one embodiment. The dispatch circuit 38 implements a dispatch table 84 comprising a set of reservation station entries RS0 through RSy. Each reservation station entry RS0 through RSy comprises an entry valid flag, an op code, a pair of source data values (SRC1/SRC2 DATA) and corresponding source data valid flags (V), a pair of physical register sources (PSRC1/PSRC2), and a physical register destination (PDST).

The dispatch circuit 38 receives the opcodes opcode_0 through opocode_3 and physical register destinations pdst_0 through pdst_3 for the physical micro-ops pmop_0 through pmop_3 over the physical micro-op bus 52, and stores the opcodes and physical destinations into the reservation station entries RS0 through RSy assigned by the allocator circuit 36. The dispatch circuit 38 assembles the source data for the physical micro-ops into the reservation station entries RS0 through RSy, and dispatches the ready physical micro-ops to the execution circuit 40. A physical micro-op is ready when the source data is fully assembled in a reservation station entry.

The entry valid flag indicates whether the corresponding reservation station entry RS0 through RSy holds a physical micro-op awaiting dispatch.

The op code specifies an operation of the execution unit circuit 40 for the physical micro-op in the corresponding reservation station entry RS0 through RSy.

The SRC1/SRC2 DATA fields of the reservation station entries RS0 through RSy hold the source data values for the corresponding physical micro-ops. The corresponding source data valid flags V indicate whether the source data values are valid.

The physical register destination PDST of each reservation station entry RS0 through RSy specifies a ROB entry in the reorder buffer 42 to hold the speculative results for the corresponding physical micro-op.

The physical register sources PSRC1/PSRC2 of each reservation station entry RS0 through RSy specify the ROB entries in the reorder buffer 42 that are assigned to hold the source data for the corresponding physical micro-op. The dispatch circuit 38 uses the physical register sources PSRC1/PSRC2 to detect write back of pending source data from the execution circuit 40 to the reorder buffer 42.

The dispatch circuit 38 receives the source data values and corresponding valid flags over the source data bus 58. The dispatch circuit 38 transfers the source data values and valid flags into the SRC1/SRC2 DATA fields and source data valid flag fields of the newly allocated reservation station entries assigned to the physical micro-ops pmop_0 through pmop_3.

If the source data valid flags indicate that one or both of the source data values for a reservation station table entry is invalid, the dispatch circuit 38 waits for the execution circuit 40 to execute previously dispatched physical micro-ops and generate the required source data values.

The dispatch circuit 38 monitors the physical register destinations on the result bus 62 as the execution circuit 40 writes back result data values to the reorder buffer 42. If a physical register destination on the result bus 62 corresponds to the physical register destination of pending source data for a reservation station table entry RS0 through RSy, then the dispatch circuit 38 receives the result data value over the result bus 62 and stores the result data value into the corresponding SRC1/SRC2 DATA fields and source data valid flags. The dispatch circuit 38 dispatches the pending physical micro-ops to the execution circuit 40 if both source data values are valid.

Figure 9:
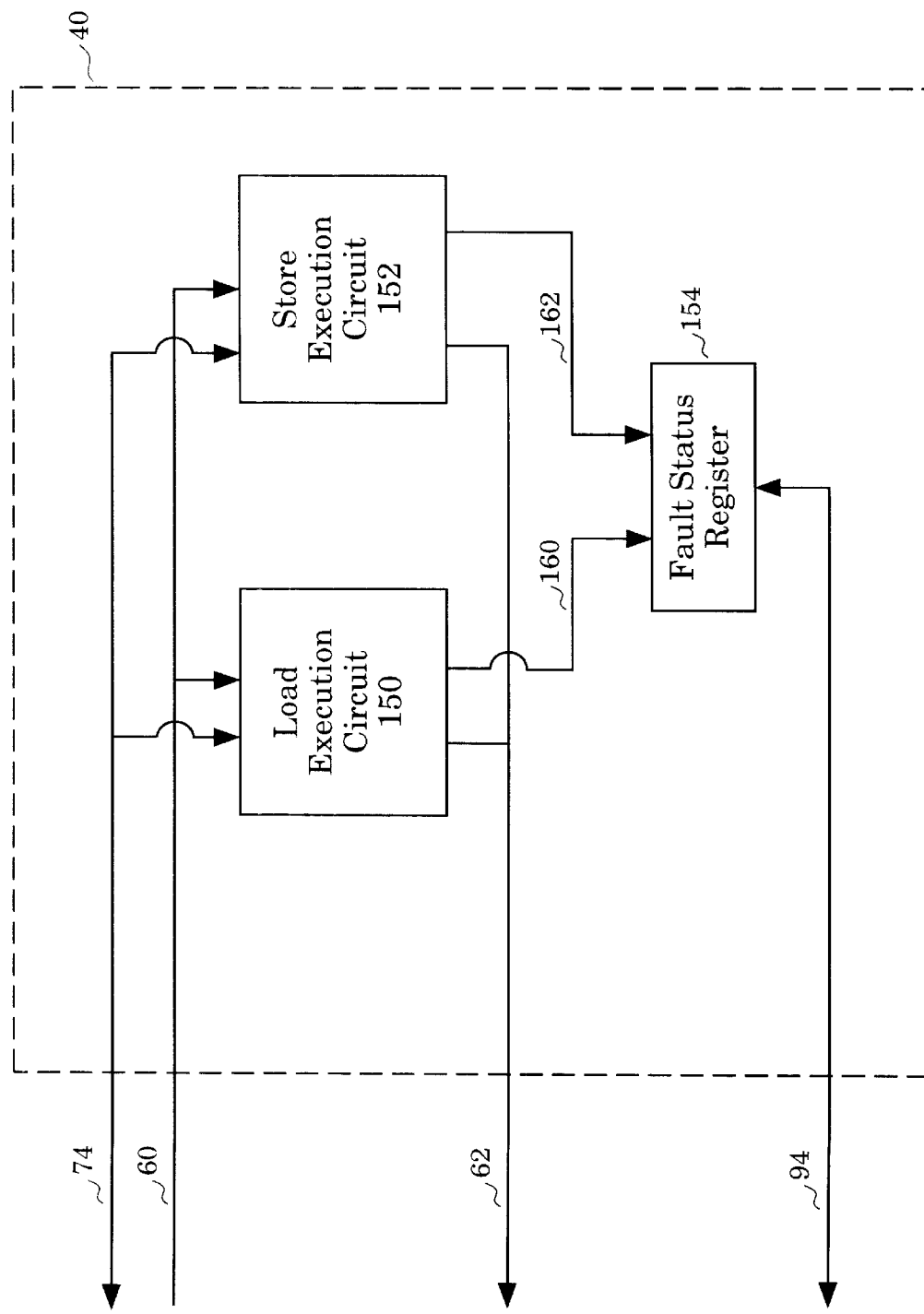
FIG. 9 illustrates execution units in the execution circuit that execute memory load and memory store micro-ops for one embodiment.

FIG. 9 illustrates execution units in the execution circuit 40 that execute memory load and memory store micro-ops for one embodiment. The execution circuit 40 comprises a load execution circuit 150, a store execution circuit 152, and a fault status register 154.

The load execution circuit 150 receives dispatched load memory micro-ops from the dispatch circuit 38 over the micro-op dispatch bus 60. The load execution circuit 150 performs the specified load memory operation by accessing the bus interface circuit 22 over the memory access bus 74, and then transfers results and exception data over the result bus 62. If the load execution circuit 150 detects an exception such as a page violation during the load memory operation, then corresponding fault information is written to the fault status register 154 over a bus 160. The fault information includes the memory address causing the exception, the physical destination for the micro-op causing the exception, and a valid bit indicating that the fault status in the fault status register 154 is valid.

The load execution circuit 150 writes fault information into the fault status register 154 only if the micro-op generating the fault information is older than any fault information already stored in the fault status register 154. An older micro-op is a micro-op occurring earlier in the instruction stream in relation to the micro-op corresponding to any valid fault status in the fault status register 154. The load execution circuit 150 determines the relative age of the faulting micro-op and the valid fault status in the fault status register 154 by comparing the physical destination of the faulting micro-op to the physical destination stored in the fault status register 154. The physical destinations reflect the relative age of micro-ops because the ROB entries in the reorder buffer 42 are allocated sequentially to incoming physical micro-ops in the sequential program order.

The store execution circuit 152 receives dispatched store memory micro-ops from the dispatch circuit 38 over the micro-op dispatch bus 60. The store execution circuit 152 performs the specified store memory operation to the bus interface circuit 22 over the memory access bus 74, and then signals results over the result bus 62. If the store execution circuit 152 detects an exception such as a page violation during the store memory operation, then corresponding fault information is written to the fault status register 154 over a bus 162. The fault information includes the memory address causing the exception, the physical destination of the micro-op causing the exception, and the valid bit. The store execution circuit 152 writes fault information into the fault status register 154 only if the micro-op generating the fault information is older than any fault information already stored in the fault status register 154.

The microinstruction sequencer 30 reads the fault information from the fault status register 154 over the control register bus 94. The read of the fault information by the microinstruction sequencer 30 clears the valid bit in the fault status register 154.

Figure 10:
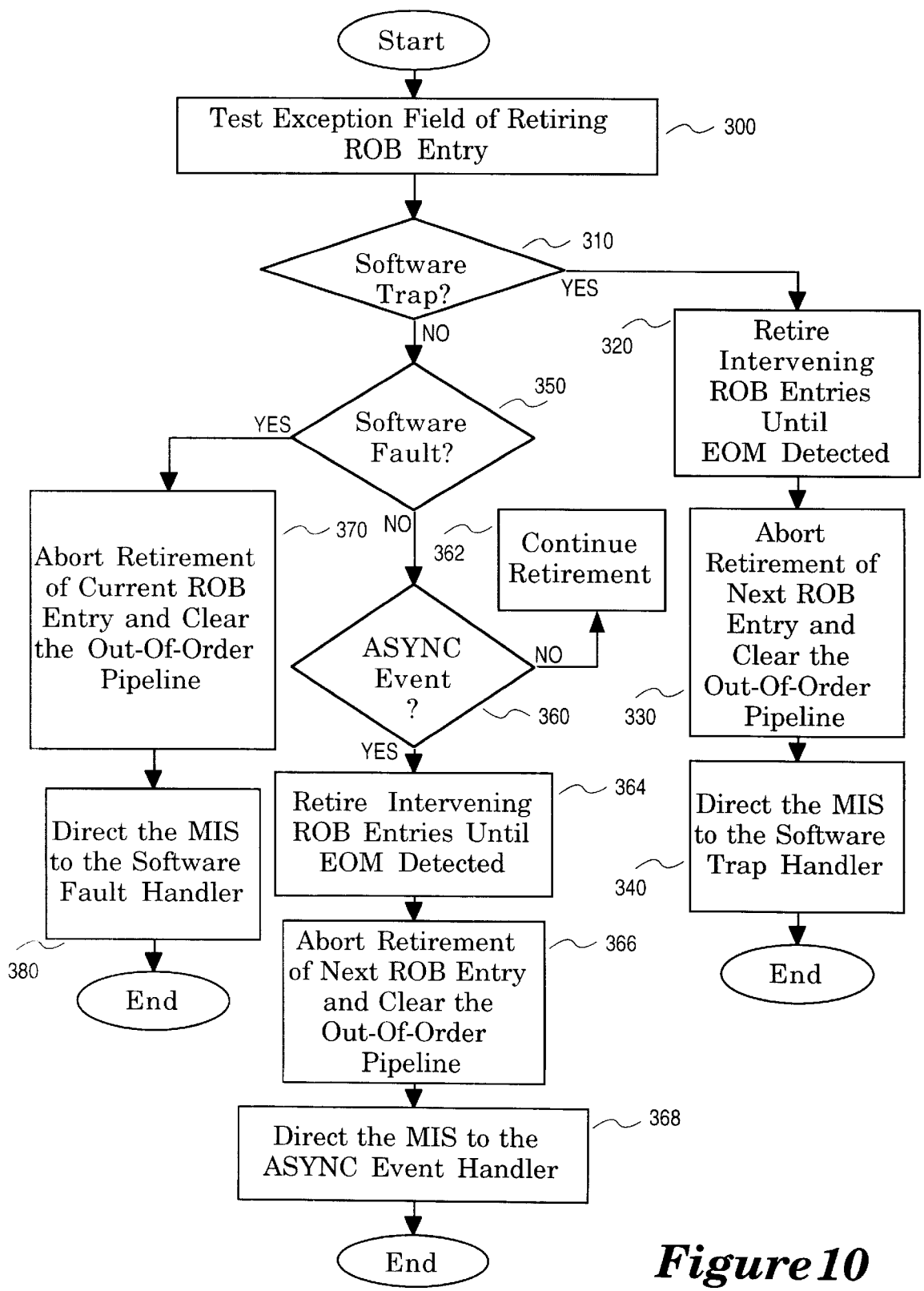
FIG. 10 illustrates a method for coordinating exceptions in the processor for one embodiment.

FIG. 10 illustrates a method for coordinating exceptions in the processor 12 for one embodiment. The retire control circuit 46 checks for exceptions during retirement operations.

At block 300, the retire control circuit 46 tests the exception data fields of the retiring ROB entries on the retirement bus 64. At decision block 310, if the exception data of a retiring ROB entry specifies a software trap, then control proceeds to block 320 to process the software trap. Otherwise, control proceeds to decision block 350 to process other exceptions.

The retire control circuit 46 processes software traps starting at block 320. For one embodiment, software traps include data breakpoints and single step traps via a debug register of the processor 12. At block 320, the retire control circuit 46 retires intervening ROB entries until a ROB entry having an EOM flow marker is detected. The retire control circuit 46 issues valid signals over the retire control bus 70 to retire the ROB entry specifying the software trap, and to retire the next ROB entry at EOM, as well as any intervening ROB entries.

Thereafter at block 330, the retire control circuit 46 aborts the retirement of the next retiring ROB entry in the sequential order. The retire control circuit 46 aborts the retirement of the subsequent ROB entries by not issuing corresponding valid bits over the retire control bus 70. The aborted ROB entries are not used to update the architectural instruction pointer or any other architectural register. Also at block 330, the retire control circuit 46 issues the restart control signal 90 to halt the incoming instruction stream and to clear pending micro-ops and speculative result data from the out-of-order execution pipeline 220.

Thereafter at block 340, the retire control circuit 46 transfers an exception vector to the microinstruction sequencer (MIS) 30 over the exception vector bus 92 that specifies the software trap.

At decision block 350, if the exception data of a retiring ROB entry specifies a software fault, then control proceeds to block 370 to process the software fault. Otherwise, control proceeds to decision block 360 to process other exceptions.

The retire control circuit 46 processes software faults starting at block 370. For one embodiment, software faults include page faults, memory protection violations, illegal instructions, and lack of privilege. At block 370, the retire control circuit 46 aborts the retirement of the ROB entry specifying the software fault, and aborts the retirement of the subsequent ROB entries by not issuing corresponding valid bits over the retire control bus 70. The aborted ROB entries are not used to update the architectural instruction pointer. The retire control circuit 46 issues the restart control signal 90 to halt the incoming instruction stream and to clear pending micro-ops and speculative result data from the out-of-order execution pipeline 220.

Thereafter at block 380, the retire control circuit 46 transfers an exception vector to the microinstruction sequencer 30 over the exception vector bus 92 that specifies the software fault.

At decision block 360, if the retire control circuit 46 detects an asynchronous event while retiring a ROB entry, then control proceeds to block 364 to process the asynchronous event. Otherwise, control proceeds to decision block 362 to continue the retirement operation.

The retire control circuit 46 processes the asynchronous event starting at block 364. For one embodiment, asynchronous events include hardware interrupts, machine checks such as parity errors, system management mode interrupts, and non maskable interrupts. At block 364, the retire control circuit 46 retires intervening ROB entries until a ROB entry having an EOM flow marker is detected.

Thereafter at block 366, the retire control circuit 46 aborts the retirement of the next retiring ROB entry in the sequential order. The retire control circuit 46 aborts the retirement of the subsequent ROB entries by not issuing corresponding valid bits over the retire control bus 70. The aborted ROB entries are not used to update the architectural instruction pointer. Also at block 366, the retire control circuit 46 issues the restart control signal 90 to halt the incoming instruction stream and to clear pending micro-ops and speculative result data from the out-of-order execution pipeline 220. Thereafter at block 368, the retire control circuit 46 transfers an exception vector to the microinstruction sequencer 30 over the exception vector bus 92 that specifies the asynchronous event.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A method of handling exceptions in a microprocessor comprising:

fetching a first instruction stream comprising a series of instructions, the instruction stream containing a branch instruction;

generating a branch prediction for the branch instruction;

speculatively fetching a second instruction stream according to the branch prediction, the second instruction stream including a further instruction;

speculatively generating a result data value and an exception indication for the further instruction in an out-of-order manner;

resolving the branch instruction;

retiring the branch instruction; and handling an exception only if the exception indication indicates an exception and only if the branch prediction was accurate, wherein the handling of the exception includes locating a flow marker, demarcating the end of the further instruction in the second instruction stream, and aborting retirement of instructions subsequent to the flow marker in the second instruction stream.

2. The method defined in claim 1 further comprising:

committing the result data value to an architectural state of the microprocessor according to a sequential program order; and fetching an exception handler to process said exception if detected while committing the result data value to the architectural state.

3. The method of claim 2, wherein the step of fetching an exception handler comprises the step of aborting commitment of the result data value to the architectural state.

4. The method of claim 2, further comprising:

sensing an asynchronous event while committing the result data value to the architectural state;

fetching an asynchronous event handler to process the asynchronous event and aborting commitment of the result data value to the architectural state if said further instruction occurs after the asynchronous event in the sequential program order.

5. A method of handling exceptions in a microprocessor comprising:

fetching an instruction stream comprising a series of instructions, the instruction stream containing at least one branch instruction and a further instruction fetched according to a branch prediction for the branch instruction;

generating a series of physical micro-ops from the instruction stream;

speculatively generating a result data value and an exception indication for a first physical micro-op generated from the further instruction, within the series of physical micro-ops;

resolving the branch instruction;

retiring the branch instruction; and handling an exception only if the exception indication indicates an exception and only if the branch prediction was accurate, wherein the handling of the exception includes continuing retirement of a second physical micro-op within the series of micro-ops downstream of the first micro-op, locating a flow marker downstream of the second physical micro-op within the series of micro-ops that demarcates the end of the further instruction in the instruction stream, and aborting retirement of physical micro-ops subsequent to the flow marker in the series of physical micro-ops.

6. The method of claim 5 wherein:

the instruction stream comprises a series of instructions according to a sequential program order; and the result data value and the exception indication are speculatively generated out-of-order.

7. A method of handling exceptions in a microprocessor comprising:

fetching a first instruction stream comprising a series of instructions according to a sequential program order, the first instruction stream including a branch instruction;

generating a branch prediction for the branch instruction;

speculatively fetching a second instruction stream comprising a series of instructions according to the branch prediction and in a sequential program order, the second instruction stream including a further instruction;

speculatively generating a result data value and an exception indication for the further instruction in an out-of-order manner;

resolving the branch instruction;

retiring the branch instruction; and handling an exception only if the exception indication indicates an exception and only if the further instruction is retired, wherein the handling of the exception includes locating a flow marker demarcating the end of the further instruction, and aborting retirement of instructions subsequent to the flow marker in the instruction stream.

8. A method of handling exceptions in a microprocessor comprising:

fetching an instruction stream;

generating a series of physical micro-ops having a sequential order from the instruction stream, the series of physical micro-ops including a branch physical micro-op and a first physical micro-op generated in reliance on a branch prediction for the branch physical micro-op;

speculatively generating a result data value and an exception indication for the first physical micro-op within the series of physical micro-ops;

resolving the branch physical micro-op;

retiring the branch physical micro-op; and handling an exception only if the exception indication indicates an exception and only if the first physical micro-op is retired, wherein the handling of the exception includes retiring a second physical micro-op within the series of physical micro-ops downstream of the first physical micro-op, locating a flow marker downstream of the second micro-op within the series of physical micro-ops that demarcates the end of a macroinstruction, and aborting retirement of physical micro-ops downstream of the flow marker within the series of physical micro-ops.

9. The method of claim 8 wherein the result data value and the exception indication are speculatively generated out-of-order.

10. A microprocessor comprising:

a front end pipeline to fetch an instruction stream comprising a series of instructions, the series of instructions comprising a branch instruction and a further instruction fetched according to a branch prediction for the branch instruction; and an in-order execution pipeline, coupled to receive the instruction stream, and speculatively to generate a result data value and an exception indication for the further instruction, to resolve the branch instruction, to retire the branch instruction, and to handle an exception only if the exception indication indicates at least one exception and only if the branch prediction was accurate, wherein the in-order execution pipeline locates a flow marker demarcating the end of the further instruction and aborts retirement of instructions subsequent to the flow marker in the instruction stream.

11. A microprocessor comprising:

a front end pipeline to fetch an instruction stream comprising a series of instructions, the series of instructions comprising a branch instruction, and a further instruction fetched according to a branch prediction for the branch instruction, and to generate the branch prediction for the branch instruction; and an out-of-order execution pipeline, coupled to receive the instruction stream, and speculatively to generate an out-of-order result data value and an exception indication for the further instruction, to resolve the branch instruction, to retire the branch instruction, and to handle an exception only if the exception indication indicates at least one exception and only if the branch prediction was accurate, wherein the out-of-order execution pipeline locates a flow marker demarcating the end of the further instruction and aborts retirement of instructions subsequent to the flow marker in the instruction stream.

12. A microprocessor comprising:

a front end pipeline to fetch an instruction stream comprising a series of instructions, the series of instructions comprising a branch instruction and a further instruction fetched according to a branch prediction for the branch instruction, and to generate the branch prediction for the branch instruction;

an instruction issue section, coupled to receive the instruction stream, to generate a series of physical micro-ops from the instruction stream; and an in-order execution pipeline, coupled to receive the series of physical micro-ops, speculatively to generate an in-order result data value and an exception indication for a first physical micro-op within the series of physical micro-ops generated from the further instruction, to resolve the branch instruction, to retire the branch instruction, and to handle an exception only if the exception indication indicates at least one exception and only if the branch prediction was accurate, wherein the in-order execution pipeline retires a second physical micro-op downstream of the first micro-op within the series of micro-ops, locates a flow marker downstream of the second micro-op within the series of micro-ops that indicates the end of the further instruction, and aborts retirement of physical micro-ops downstream of the flow marker in the instruction stream.

13. A microprocessor comprising:

a front end pipeline to fetch an instruction stream comprising a series of instructions, the series of instructions comprising a branch instruction and a further instruction fetched according to a branch prediction for the branch instruction, and to generate the branch prediction for the branch instruction;

an instruction issue section, coupled to receive the instruction stream, to generate a series of physical micro-ops from the instruction stream; and an out-of-order execution pipeline, coupled to receive the series of physical micro-ops, speculatively to generate an out-of-order result data value and an exception indication for a first physical micro-op within the series of physical micro-ops generated from the further instruction, for resolving the branch instruction, to retire the branch instruction, and to handle an exception only if the exception indication indicates at least one exception and only if the branch prediction was accurate, wherein the out-of-order execution pipeline retires a second physical micro-op downstream of the first micro-op within the series of micro-ops, locates a flow marker downstream of the second micro-op within the series of micro-ops that indicates the end of the further instruction, and aborts retirement of physical micro-ops downstream of the flow marker in the instruction stream.

14. A microprocessor comprising:

a front end pipeline to fetch an instruction stream comprising a series of instructions, the series of instructions comprising a branch instruction and a further instruction fetched according to a branch prediction for the branch instruction, and to generate the branch prediction for the branch instruction;

an instruction issue section, coupled to receive the instruction stream, to generate a series of physical micro-ops from the instruction stream; and an out-of-order execution pipeline, coupled to receive the series of physical micro-ops, speculatively to generate an out-of-order result data value and an exception indication for a first physical micro-op within the series of physical micro-ops generated from the further instruction, to resolve the branch instruction, to retire the physical micro-ops generated from the branch instruction, and to handle an exception only if the exception indication indicates at least one exception and only if the branch instruction is retired, wherein the out-of-order execution pipeline locates a flow marker indicating the end of the further instruction, and only aborts retirement of physical micro-ops subsequent to the flow marker in the series of physical micro-ops but continues retirement of any physical micro-ops in the series of physical micro-ops between the first physical micro-op and the flow marker.

15. A microprocessor comprising:

first means for fetching an instruction stream comprising a series of instructions, the series of instructions comprising a branch instruction and a further instruction fetched according to a branch prediction for the branch instruction, and for generating the branch prediction for the branch instruction; and second means for speculatively generating a result data value and an exception indication for the further instruction, for resolving the branch instruction, for retiring the branch instruction, and for handling an exception only if the exception indication indicates at least one exception and only if the branch prediction was accurate, wherein the second means locates a flow marker indicating the end of the further instruction, and aborts retirement of instructions subsequent to the flow marker in the series of instructions.

16. A microprocessor comprising:

first means for fetching an instruction stream comprising a series of instructions, the series of instructions comprising a branch instruction and a further instruction fetched according to a branch prediction for the branch instruction;

second means for generating a series of physical micro-ops, having a sequential order, from the instruction stream; and third means for speculatively generating a result data value and an exception indication for a first physical micro-op, generated from the further instruction, for resolving the branch instruction, and for handling an exception only if the exception indication indicates at least one exception and only if the branch prediction was accurate, wherein the third means locates a flow marker downstream of the first physical micro-op within the series of physical micro-ops that indicates the end of the further instruction, and aborts retirement of physical micro-ops proceeding the flow marker in the series of physical micro-ops but continues retirement of a second physical micro-op between the first physical micro-op and the flow marker in the series of physical micro-ops.

\* \* \* \* \*